United States Patent
Qi et al.

(10) Patent No.: US 8,717,932 B2
(45) Date of Patent: May 6, 2014

(54) METHOD AND SYSTEM FOR DETERMINING AND SECURING PROXIMITY INFORMATION OVER A NETWORK

(75) Inventors: Zheng Qi, San Jose, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 381 days.

(21) Appl. No.: 11/756,340

(22) Filed: May 31, 2007

(65) Prior Publication Data
US 2008/0123555 A1    May 29, 2008

Related U.S. Application Data (60) Provisional application No. 60/867,750, filed on Nov. 29, 2006.

(51) Int. Cl.
*H04L 12/28*    (2006.01)

(52) U.S. Cl.
USPC .......................................... 370/254; 710/316

(58) Field of Classification Search
USPC ......... 370/254, 352, 252, 516, 238, 235, 400; 455/456.1; 324/158.1; 709/227; 702/150; 713/300, 168; 705/14
See application file for complete search history.

(56) References Cited

U.S. PATENT DOCUMENTS

| | | | |
|---|---|---|---|
| 6,885,641 B1 * | 4/2005 | Chan et al. ..................... | 370/252 |
| 7,302,269 B1 * | 11/2007 | Crawford et al. .......... | 455/456.1 |
| 7,408,337 B2 * | 8/2008 | Persons ....................... | 324/158.1 |
| 2002/0039371 A1 * | 4/2002 | Hedayat et al. ............... | 370/516 |
| 2003/0046022 A1 * | 3/2003 | Silverman ..................... | 702/150 |
| 2003/0225893 A1 * | 12/2003 | Roese et al. .................. | 709/227 |
| 2004/0252646 A1 * | 12/2004 | Adhikari et al. .............. | 370/252 |
| 2005/0262364 A1 * | 11/2005 | Diab et al. .................... | 713/300 |
| 2006/0007863 A1 * | 1/2006 | Naghian ....................... | 370/238 |
| 2006/0187916 A1 | 8/2006 | Vasseur et al. | |
| 2007/0153772 A1 | 7/2007 | Shankar et al. | |
| 2007/0189184 A1 * | 8/2007 | Ryu et al. ..................... | 370/252 |
| 2008/0008203 A1 | 1/2008 | Frankkila et al. | |
| 2008/0010367 A1 | 1/2008 | Chen et al. | |
| 2008/0031136 A1 * | 2/2008 | Gavette et al. ................ | 370/235 |
| 2008/0056231 A1 * | 3/2008 | Langner ....................... | 370/352 |
| 2008/0089347 A1 * | 4/2008 | Phillipi et al. ................ | 370/400 |
| 2008/0101253 A1 | 5/2008 | Shvodian | |
| 2008/0101277 A1 * | 5/2008 | Taylor et al. .................. | 370/328 |
| 2008/0117938 A1 | 5/2008 | Erich et al. | |
| 2008/0250243 A1 * | 10/2008 | Bretheim ...................... | 713/168 |
| 2008/0285568 A1 | 11/2008 | Diab et al. | |
| 2009/0138356 A1 * | 5/2009 | Pomplun ........................ | 705/14 |
| 2009/0185501 A1 | 7/2009 | Huang et al. | |
| 2010/0128738 A1 | 5/2010 | Barrass | |

* cited by examiner

*Primary Examiner* — Dang Ton
*Assistant Examiner* — Lionel Preval
(74) *Attorney, Agent, or Firm* — Sterne, Kessler, Goldstein & Fox PLLC (57) ABSTRACT

Aspects of a method and system for determining and securing proximity information over a network are provided. In this regard, data transmitted over a network may be time-stamped upon entering and/or exiting a network node. By taking the total time to travel between two network nodes and subtracting out any latency internal to one or more intermediate nodes, the time to traverse the physical links (the propagation time) between the two network nodes may be determined. Accordingly, if the speed at which data propagates over each link of the network is known, then a distance from the source node to the destination node may be determined. Additionally, aspects of the invention may enable one or more of authentication, validation, and encryption of timing and/or proximity information transmitted over a network.

19 Claims, 6 Drawing Sheets

METHOD AND SYSTEM FOR DETERMINING AND SECURING PROXIMITY INFORMATION OVER A NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 60/867,750 filed on Nov. 29, 2006.

The above stated application is hereby incorporated herein by reference in its entirety.

FIELD OF THE INVENTION

Certain embodiments of the invention relate to computer networking. More specifically, certain embodiments of the invention relate to a method and system for determining and securing proximity information over a network.

BACKGROUND OF THE INVENTION

Accurately determining the location of a source of data transmitted over a network may be useful in many situations. For example, determining the source of a 911 call is critical for emergency workers to respond effectively. In this regard, traditional circuit switched telephone networks are deterministic in that the path and delay of information over the network is known, and as a result, the source of the call may be determined. However, for a VoIP phone, determining the source of a 911 call with sufficient accuracy is difficult if not impossible, using conventional technology. In this regard, obtaining accurate proximity information in non-deterministic packet switched networks (PSN), such as the Internet, is difficult due to variable delays caused by factors such as operating system of a traversed network node, network congestion, routing path, for example. One method conventionally used to determine proximity of nodes in a network is time-domain reflectometry (TDR). However, if there are no discontinuities in the physical links, or the connections are very well matched, then TDR does not provide a very accurate measurement. Accordingly, conventional methods for determining the location of a source of a packet provide insufficient proximity accuracy for many applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for determining and securing proximity information over a network substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for determining and securing proximity information over a network. In accordance with an embodiment of the invention, data transmitted over a network may be time-stamped upon entering and/or exiting a network node. By taking the total time to travel between two network nodes and subtracting out any latency internal to one or more intermediate nodes, the time to traverse the physical links (the propagation time) between the two network nodes may be determined. Accordingly, if the speed at which data propagates over each link of the network is known, then a distance from the source node to the destination node may be determined. Additionally, aspects of the invention may enable one or more of authentication, validation, and encryption of timing and/or proximity information transmitted over a network. In this regard, the determined and secured proximity information may be utilized, for example, to locate the source location of VoIP calls, to implement digital rights management (DRM) policies, and to optimize power distribution over a network.

Figure 1:
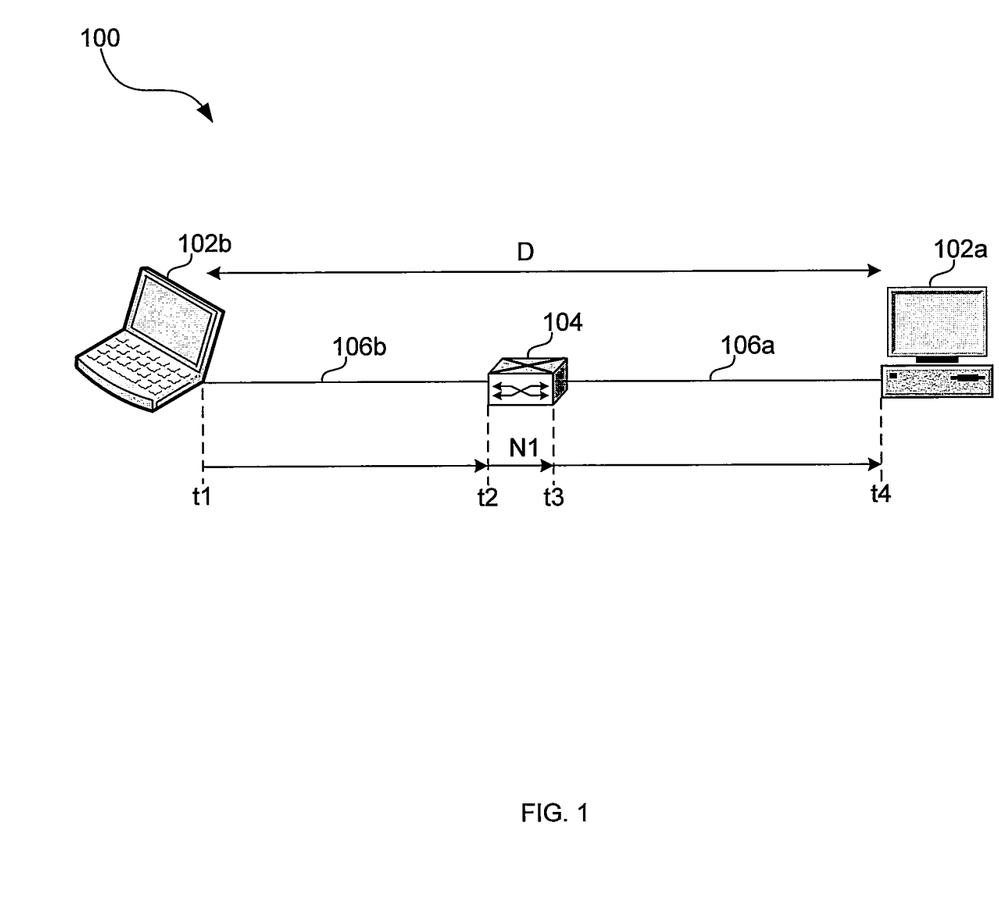
FIG. 1 is diagram of an exemplary network for which proximity information may be determined, in accordance with an embodiment of the invention.

FIG. 1 is diagram of an exemplary network for which proximity information may be determined, in accordance with an embodiment of the invention. Referring to FIG. 1 the network may comprise end systems 102a, 102b, switch 104, and physical links 106a, 106b. In one embodiment of the invention, the end system 102b may, for example, comprise one or more applications for which use is restricted by a digital rights management (DRM) policy. For example, the DRM may require that the application only be used in a defined location. In this regard, the location may be determined by the distance from the 102b to the end system 102a. Accordingly, the end system 102a may be a server responsible for enforcing the DRM policy. In another embodiment of the invention, the end system 102b may comprise a VoIP phone utilized to place a 911 call and the end system 102a may be a server or other node responsible for determining the location from which the 911 call was placed. Also, in various exemplary embodiments of the invention, the network 100 may utilize Ethernet technology.

The end systems 102a, 102b may comprise suitable logic, circuitry, and/or code that may enable generation, transmission, and/or reception of messages to/from the network 100. In this regard, the end systems 102a, 102b, may comprise one or more system clocks and may enable utilizing protocols such as IEEE 1588 and 802.1as to synchronize the system clocks. Accordingly, received synchronization packets may be identified in the physical layer (Layer 1 of the OSI model) and the corresponding timestamp may be stored, forwarded with the packet, and/or transmitted in one or more subsequent packets.

Additionally, the end systems 102a, 102b may comprise suitable logic, circuitry, and/or code that may enable implementing one or more security protocols. In this regard, information exchanged between the end systems 102a, 102b may be authenticated, validated, and/or encrypted. Accordingly, aspects of the invention may enable ensuring that the end systems 102a, 102b reliably synchronize to one or more clocks and reliably transmit accurate timing information. In this regard, exemplary security protocols utilized may comprise Ipsec, IEEE 802.1AE(MACsec), IEEE 802.1af(authentication and key management), and/or IEEE 802.1ar(Secure Device ID).

The switch 104 may comprise suitable logic, circuitry, and/or code that may enable transmission and/or reception of messages to/from the network 100. In this regard, the switch 104 may comprise one or more system clocks and may enable utilizing protocols such as IEEE 1588 and 802.1 as to synchronize the one or more system clocks to system clocks comprising other nodes connected to the network 100. Accordingly, received synchronization packets may be identified in the physical layer (Layer 1 of the OSI model) and the corresponding timestamp may be stored, forwarded with the packet, and/or transmitted in one or more subsequent packets.

Additionally, the switch 104 may comprise suitable logic, circuitry, and/or code that may enable usage of one or more security protocols. In this regard, data transmitted and/or received by the switch 104 may be authenticated, validated, and/or encrypted. Accordingly, aspects of the invention may enable ensuring that the switch 104 reliably synchronizes to one or more clocks and reliably transmits accurate timing information. In this regard, exemplary security protocols utilized may comprise IPsec, IEEE 802.1AE(MACsec), IEEE 802.1af(authentication and key management), and/or IEEE 802.1ar(Secure Device ID).

The links 106a, 106b may comprise physical links connecting the nodes comprising the network 100. In this regard, the physical links may, for example, comprise one or more of the following: coaxial cable, twisted pair cabling, fiber optic cabling, and one or more wireless channels.

In an exemplary operation, end system 102a may act as a master clock and may initiate synchronization, utilizing the precision time protocol (PTP), for example, with the end system 102b and the switch 104. In this regard, each of the nodes 102a, 102b, and 104 may comprise one or more security features to ensure that the synchronization protocol is adhered to and that packets transmitted over the network 100 are not tampered with, spoofed, or compromised in any other manner. For example, each of the nodes 102a, 102b, and 104 may comprise a secure device ID that may enable authenticating, validating, and/or encrypting/decrypting data. In various embodiments of the invention, the secure device ID may be stored in Hardware and may be utilized for key generation and management.

Upon completing a secure PTP synchronization, timing information may be relied upon to determine proximity information in the network 100. In this regard, in various embodiments of the invention, the end system 102a may transmit a secure request for a time stamped packet from the end system 102b. As a result, the end system 102b may respond by transmitting a secure reply packet onto link 106b at time t1. The reply packet may arrive at the switch 104 at time t2, where it may be processed before being forwarded onto link 106a at time t3. The reply packet may arrive at the end system 102b at time t4. In this manner, the peer-to-peer delay for the replay packet may be (t4−t1), the time to traverse link 1 is (t2−t1), the internal latency of the switch 104 may be (t3−t2), and the time to traverse link 2 may be (t4−t3). Accordingly, the actual propagation time of the reply packet is (t4−t3)+(t2−t1). Consequently, if the propagation speed of the packet along each of the links 106a and 106b may be known, then an accurate determination of the distance between the end systems 102a and 102b may be determined utilizing the following relationship, $$D=(t4-t3)\cdot S_A+(t2-t1)\cdot S_B \qquad \text{EQ. 1}$$

where $S_A$ and $S_B$ are the speed of propagation along link 106a and 106b respectively. For example, if the links 106a and 106b are coaxial cable, the data may propagate at a speed of $(2/3)*c$, where 'c' is the speed of light.

Figure 1B:
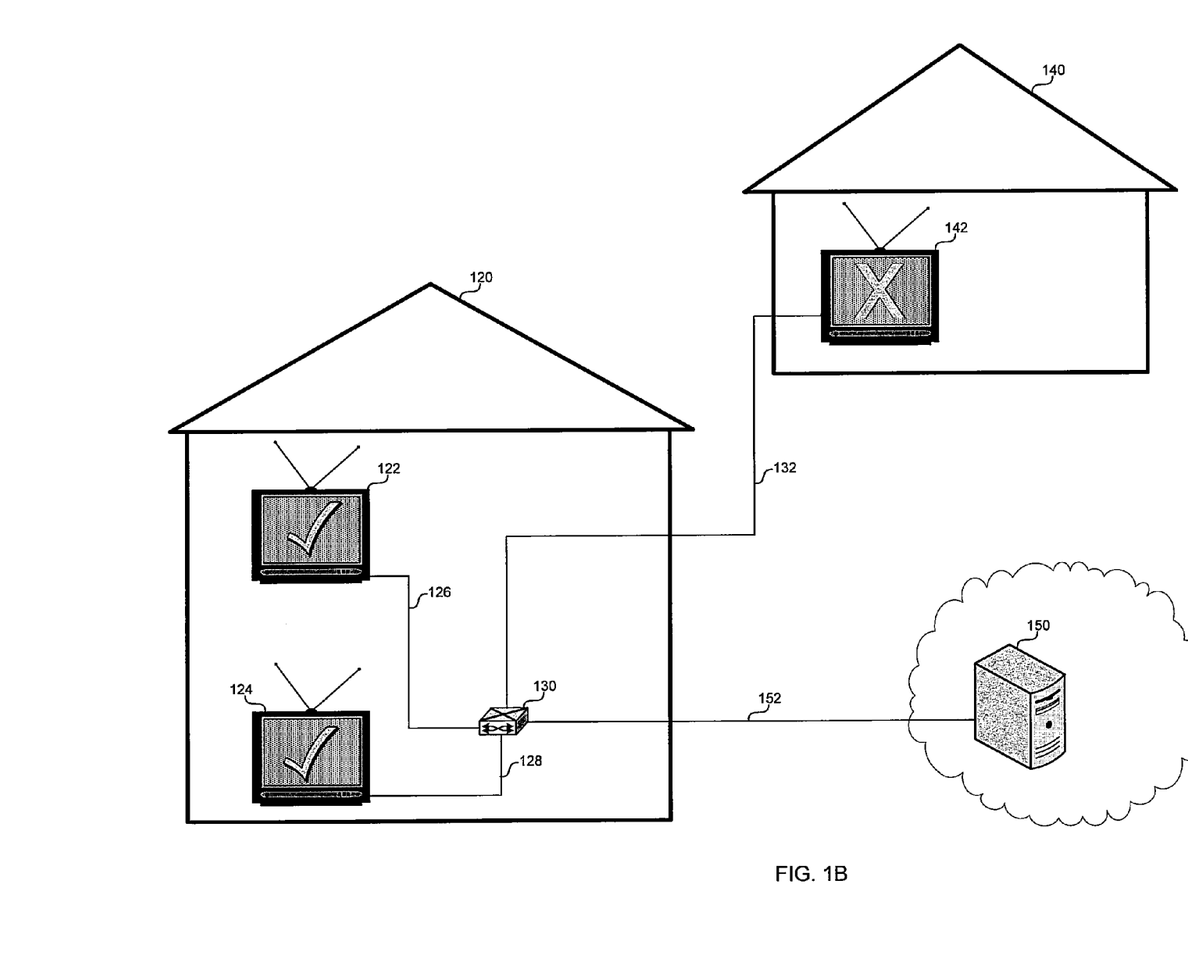
FIG. 1B is an exemplary diagram illustrating the utilization of network proximity information to implement DRM, in accordance with an embodiment of the invention.

FIG. 1B is an exemplary diagram illustrating the utilization of network proximity information to implement DRM, in accordance with an embodiment of the invention. Referring to FIG. 1B, there is shown a licensed house 120 an unlicensed house 140, and a content server 150. The licensed house 120 may further comprise televisions 122 and 124 and a network gateway 130. The unlicensed house may comprise a television 142.

The network gateway 130 may be similar to or the same as the switch 104 disclosed in FIG. 1. The content server 150 and the televisions 122, 124, and 142 may be similar to or the same as one or more of the end systems 102 disclosed in FIG. 1. In this regard, the content server 150 and/or the televisions 122 and 124 may be enabled to generate, transmit, and/or receive proximity information and/or information utilized in determining network proximity in a manner similar to or the same as in the network 100 of FIG. 1.

In operation, the content server 150 may, for example, provide DRM protected television over IP (TVIP). In this regard, the household 120 may be a subscriber to the TVIP services while the household 140 may not be a subscriber. By utilizing network proximity information, the TVIP content may be restricted to the house 120 based on the distance from a television to the network gateway 130. In this regard, the network cables 126 and 128 may be less than a maximum distance, while the network cable 132 may exceed a maximum distance. Accordingly, the TVIP services may be viewed on the televisions 122 and 124, but not on the television 142. Similarly, if a TV, such as the TV 142, can not provide proximity information, it may not be granted access to the restricted content.

Figure 2:
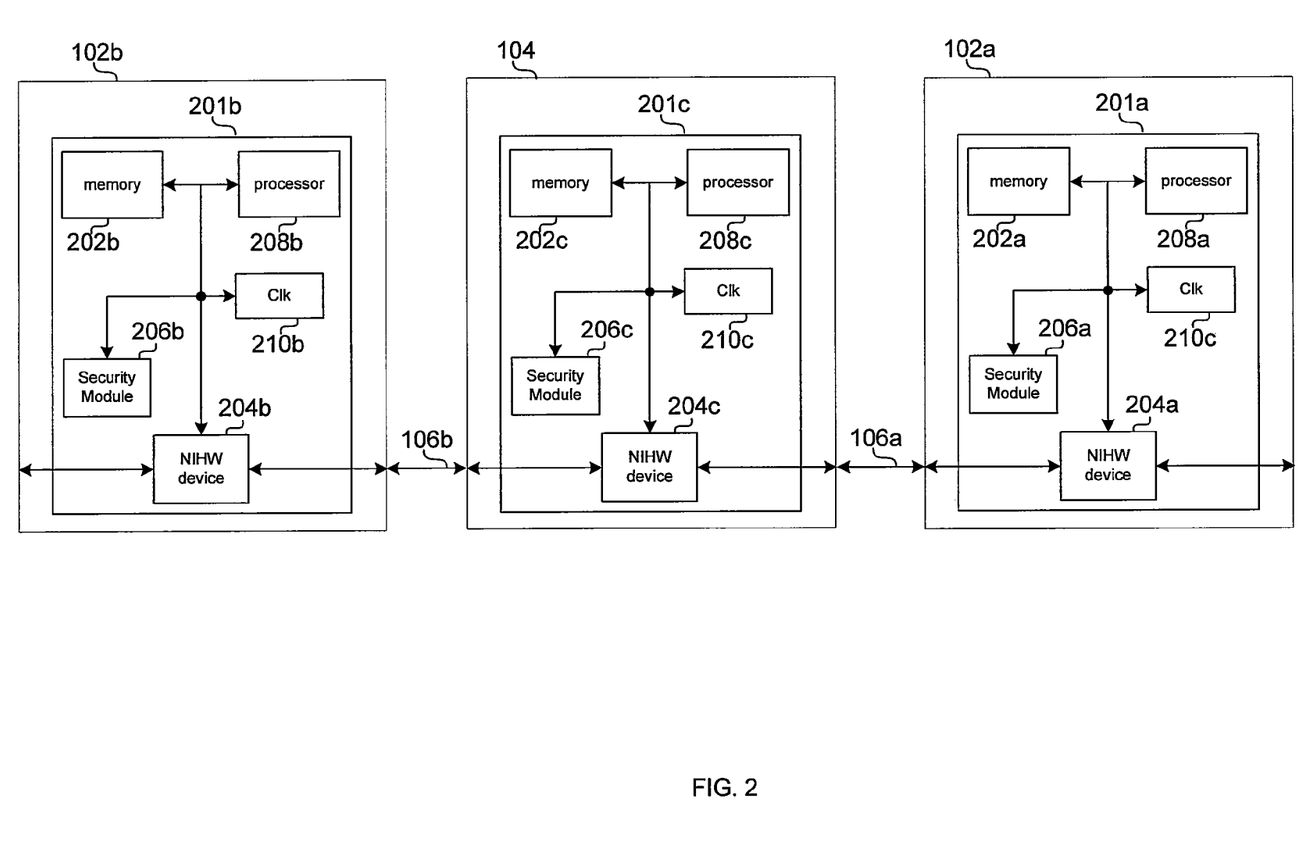
FIG. 2 is a block diagram of a packet processing core, in accordance with an embodiment of the invention.

FIG. 2 is a block diagram of a packet processing core 201 comprising the nodes 102a, 102b, 104 described in FIG. 1, in accordance with an embodiment of the invention. Referring to FIG. 2, the processing core 201 may comprise a memory 202, a network interface hardware (NIHW) device 204, a security module 206, a clock 210, and a processor 208.

The memory 202 may comprise suitable logic, circuitry, and/or code that may enable storing information utilized for processing packets. In this regard, the memory may enable storing of keys, security protocols, and other information, which may be utilized by nodes connected to the network 100. Additionally, the memory may be used to buffer data, store temporary data, etc.

The NIHW device 204 may comprise suitable logic, circuitry, and/or code that may enable reception and/or transmission of packets in a network. In this regard, the NIHW device 204 may enable reception and/or transmission of bits over a physical medium and may enable communicating the received bits to the processor 406 and/or the memory 202. Additionally, the NIHW device 204 may enable detecting the arrival of bits over a physical medium and generating a corresponding timestamp. Similarly, the NIHW device 204 may enable generation of timestamps corresponding to bits it transmits. In an exemplary embodiment of the invention, the NIHW device 201 may interface to a network utilizing Ethernet technology.

The security module 206 may comprise suitable logic circuitry and/or code that may enable authentication, validation, encryption, and/or decryption of data. In this regard, the data may be received via the NIHW device 204 and/or may be internally generated in the processing core 201. Accordingly, the security module 206 may enable generating and sharing secured keys which may be utilized for a number of security protocols. In an exemplary embodiment, the security module 206 may comprise a factory installed device ID which may be generated utilizing a true hardware random number generator and may be protected so it may never leave a secure hardware boundary. In this manner, the security module 206 may support numerous security protocols including, but not limited to, MACsec and IPsec protocols.

The clock 210 may comprise suitable logic, circuitry, and/or code that may enable generation of a time reference signal. In this regard, the clock 210 may provide one or more control signals to the memory 202, the NIHW device 204, the security module 206, and/or the processor 208. Additionally, the clock may be programmable and/or adjustable based on one or more signals received from the memory 202, the NIHW device 204, the security module 206, and/or the processor 208.

The processor 208 may comprise suitable logic, circuitry, and/or code that may enable interfacing with the memory 202, the NIHW device 204, and the hardware security module 206 to generate, receive, process, and/or forward packets. In this regard, the processor 208 may provide control signals and/or instructions to the memory 202, the NIHW device 204, and the hardware security module 206. The processor 208 may execute instructions that may enable parsing received packets, assembling packets to be transmitted, storing and accessing information in the memory 202, generating and/or accessing security keys utilizing the hardware security module 206, receiving data and timestamp information from the NIHW device 204, and sending data to the NIHW device 204.

In an exemplary operation, the clock 210a may act as a master clock and the end system 102a may initiate synchronization with the end system 102b and the switch 104. The synchronization may, for example, utilize the precision time protocol (PTP). The processor 208a may interface with the memory 202a, the clock 210a, and/or the security module 206a to generate a secure 'sync' packet. In this regard, the 'sync' packet may comprise information and/or formatting that may enable a receiving node to authenticate the 'sync' packet. Additionally, the 'sync' packet may be encrypted such that it may be kept confidential between selected nodes. The 'sync' packet may then pass to the NIHW device 204a, where it may be converted to a bit-stream and transmitted onto the link 106a. Additionally, the NIHW device 204a may generate a secure timestamp t1 corresponding to the time the 'sync' packet was transmitted onto the link 106a. The processor 208a may interface with the memory 202a, the clock 210a, and/or the security module 206a to generate a secure 'timestamp' packet comprising t1. In this regard, the 'timestamp' packet may comprise information and/or formatting that may enable a receiving node to authenticate the 'timestamp' packet. Additionally, the 'timestamp' packet may be encrypted such that it is kept confidential between selected nodes.

The bit-stream comprising the 'sync' packet may arrive at the NIHW device 204c. The NIHW device 204c may generate a timestamp t2 corresponding to the arrival of the sync packet. The NIHW device 204c may also receive the subsequent packet comprising the timestamp t1. The NIHW device 204c may re-assemble the bit-streams into packets and may make the packets available to the processor 208c, the memory 202c, the clock 210c, and/or the security module 206c. The processor 208c may interface with the memory 202c and/or the security module 206c to authenticate and/or decrypt the received packets and the timestamps t1 and t2. Based on the timestamps t1 and t2, the clock 210c may be adjusted. The processor 208c may also interface with the memory 202c, the clock 210c, and/or the security module 206c to prepare the packets for forwarding. In this regard, the packets may comprise information and/or formatting that may enable a receiving node to authenticate the forwarded packets. Additionally, the forwarded packets may be encrypted such that they are kept confidential between selected nodes. The packets may be passed to the NIHW device 204c where they may be converted to bit-streams and transmitted onto the link 106b. Additionally, the NIHW device 204c may generate a secure timestamp t3 corresponding to the time the 'sync' packet was forwarded onto the link 106b. The processor 208a may also interface with the memory 202a, the clock 210a, and/or the security module 206a to generate a secure 'timestamp' packet comprising t1, t2, and/or t3. In this regard, the 'timestamp' packet may comprise information and/or formatting that may enable a receiving node to authenticate the packet and/or the timestamps. Additionally, the 'timestamp' packet may be encrypted such that it is kept confidential between selected nodes.

The bit-stream comprising the 'sync' packet may arrive at the NIHW device 204b. The NIHW device 204b may generate a timestamp t4 corresponding to the arrival of the sync packet. The NIHW device 204b may also receive the subsequent packet comprising the timestamps t1, t2, and/or t3. The NIHW device 204b may re-assemble the bit-streams into packets and may make the packets available for processing by the processor 208b, the memory 202b, the clock 210b, and/or the security module 206b. The processor 208b may interface with the memory 202b, the clock 210b, and/or the security module 206b to authenticate and/or decrypt the received packets and the timestamps t1, t2, t3, and/or t4. Based on the timestamps t1, t2, t3, and/or t4, the clock 210b may be adjusted.

One or more additional packets may be exchanged to complete the synchronization process. Nevertheless, upon completing a secure synchronization, timing information may be utilized by the end system 102a to determine the distance to end system 102b. In this regard, packets may be sent into the network similar to the way they are sent during synchronization. However, rather than adjusting the clocks 210a, 210b, and 210c, the timestamps may be utilized to determine proximity information as described above in EQ. 1. In this manner, the processor 206a may interface with the memory 202a, the clock 210a, the security module 206a, and/or the NIHW device 204a to enable performing the calculation described above in EQ. 1.

Figure 3:
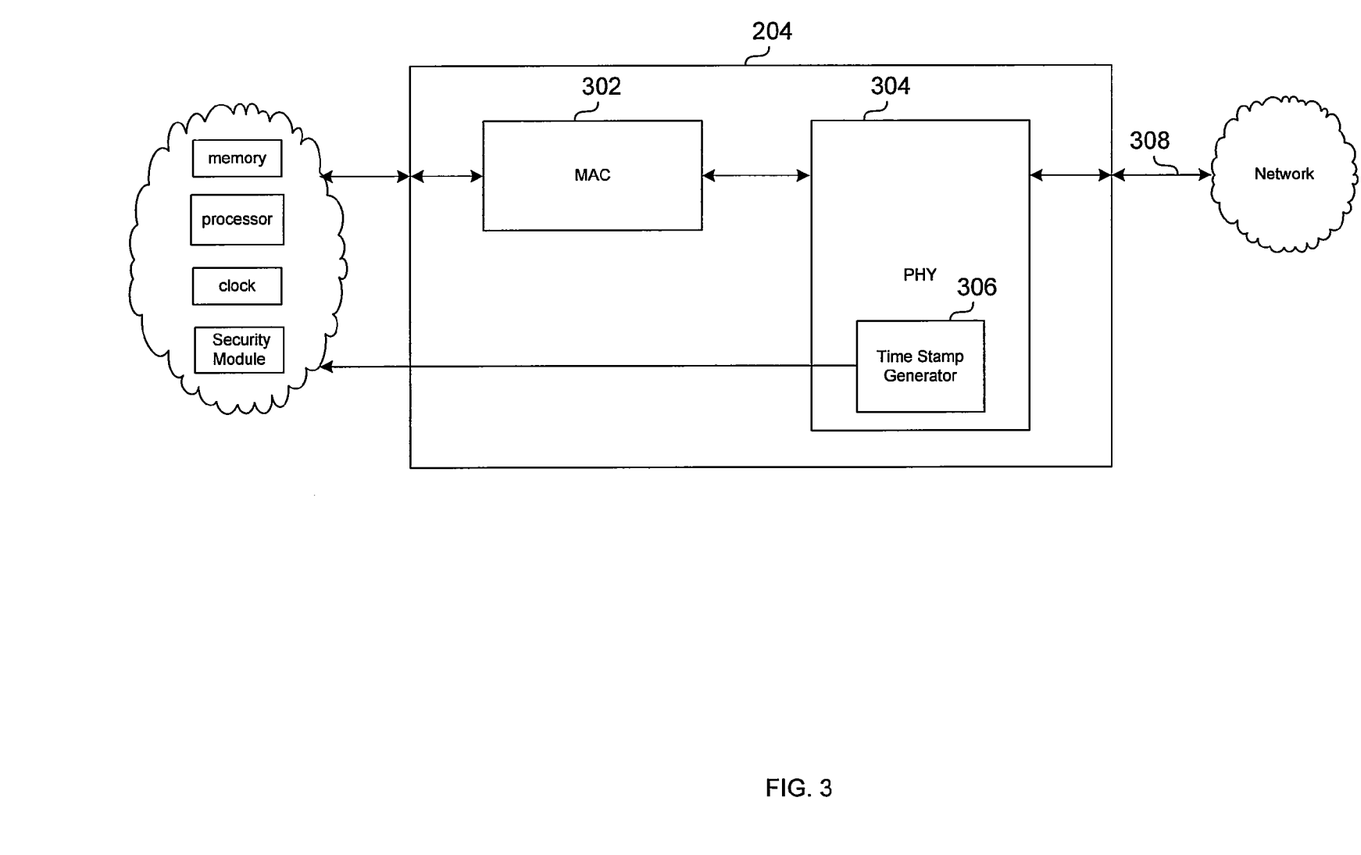
FIG. 3 is a block diagram of a network interface hardware (NIHW) device, in accordance with an embodiment of the invention.

FIG. 3 is a block diagram of a network interface hardware (NIHW) device in accordance with an embodiment of the invention. In this regard, the NIHW 204 may be as described in FIG. 2. Referring to FIG. 3 the NIHW device 204 may comprise a media access controller (MAC) 302, and a physical layer transceiver (PHY) 304.

The MAC 302 may comprise suitable logic, circuitry, and or code that may enable providing addressing and access control to a network such as the network 100. In this regard, the MAC 302 may enable multiple nodes to transmit and receive data over a common link. In one embodiment of the invention, the MAC 302 may enable communication over a network utilizing Ethernet protocols.

The PHY 304 may comprise suitable logic, circuitry, and/or code that may enable the PHY 304 to transmit or receive data bits over a physical medium. In this regard, the PHY 304 may enable converting between digital values and analog symbols impressed on the physical medium. In an exemplary embodiment of the invention, the medium may comprise twisted pair or coaxial cabling, and the transmitted symbols may be as defined by Ethernet protocols. The PHY 304 may additionally comprise a timestamp generator 306.

The timestamp generator 306 may comprise suitable logic, circuitry, and/or code that may enable an identification of a leading edge of one or more symbols in a physical medium and may generate a time stamp corresponding to the leading edge.

In operation, a symbol may arrive at the NIHW 204 via the physical link 308 and may be received by the PHY 304. The timestamp generator 306 may, for example, compare the voltage on the physical link to an internal reference voltage and generate a timestamp when the voltage on the link 308 exceeds the reference voltage. Additionally the PHY 304 may enable converting the received symbols to digital values. Upon assembling a packet, the PHY 304 may pass the packet to the MAC 302. The MAC 302 may be enabled to, for example, determine whether the packet is to be processed or dropped.

The NIHW device 204 may similarly transmit packets into the network. In this regard, the MAC 302 may determine whether the physical link in available and if so, may pass one or more packets to the PHY 304. The PHY 304 may convert the digital values received from the MAC 302 into series of analog symbols impressed onto the link 106. The timestamp generator 306 may compare the voltage impressed on the physical link to an internal reference voltage and generate a timestamp when the voltage on the link 308 exceeds the reference voltage.

Figure 4:
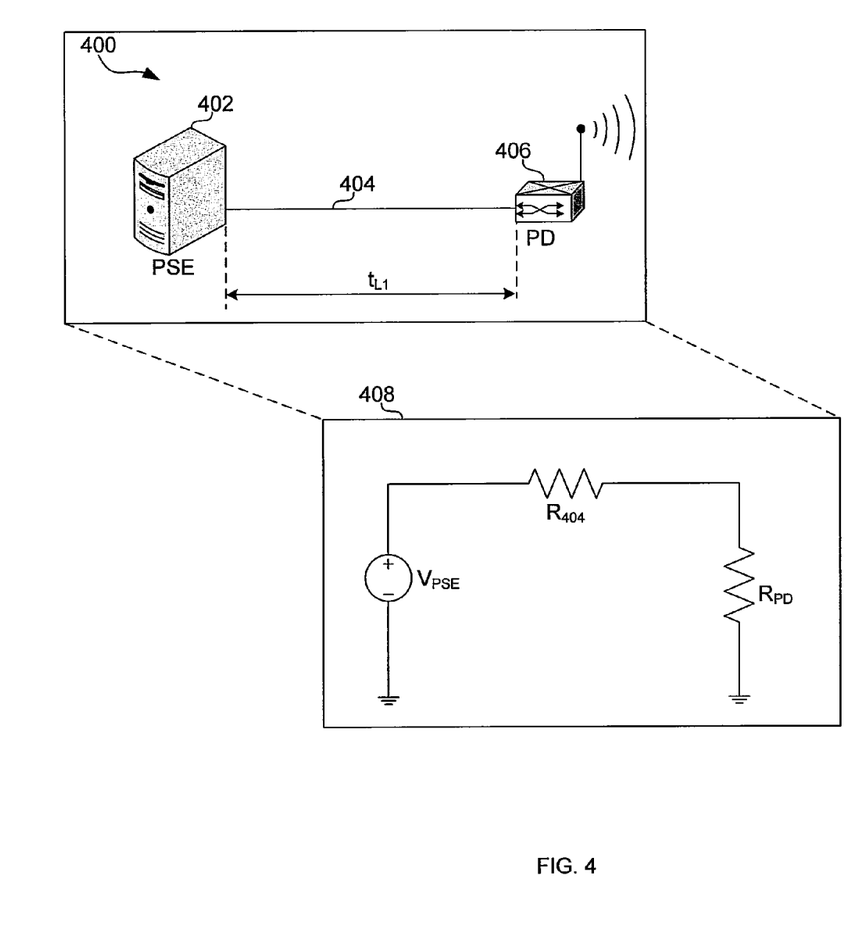
FIG. 4 is a diagram of an exemplary network in which power is delivered over the network, in accordance with an embodiment of the invention.

FIG. 4 is a diagram of an exemplary network 400 in which power may be delivered over the network, in accordance with an embodiment of the invention. Referring to FIG. 4, the network 400 may comprise power supplying equipment (PSE) 402, a physical link 404, and a power device 406.

The PSE 402 may comprise suitable logic, circuitry, and/or code that may enable supplying power via a network interface. In this regard, the PSE 402 may output DC and/or AC voltage and/or current onto a network link. Additionally, the PSE 402 may be enabled to determine a distance to the PD 406 and adjusting the output voltage and/or current. In various embodiments of the invention, the PSE 402 may comprise, for example, one or more computers, servers, bridges, routers, or other devices.

In various embodiments of the invention, the physical link 404 may comprise, for example, twisted pair and/or coaxial cabling. In this regard, the physical link 404 may be characterized by finite resistance per unit length. Consequently, a finite length of cabling may comprise a finite resistance, and in delivering voltage and/or current from the PSE 402 to the PD 406, some power may be dissipated in the physical link 404.

The PD 406 may comprise suitable logic, circuitry, and/or code that may enable receiving power via a network interface. In this regard, the PD 406 may receive AC and/or DC power via a network connection such as the link 406. In various embodiments of the invention, the PD 406 may, for example, comprise a VoIP phone, a router, a switch, a bridge, or a wireless access point.

In operation, the PSE 402 may determine the distance to the PD 406 as described in FIGS. 1 and 2. If the resistance per unit length of the physical link 404 is known, the distance may be multiplied by the resistance per unit length to determine the total resistance of the physical link 404. Hence, if the equivalent load of the PD is known, the network may be modeled as shown in the equivalent circuit 408. In this manner, the PSE may be modeled as a voltage source, the link may be modeled as a resistor, and the load may be modeled as a resistor. Accordingly, the voltage output by the PSE may be adjusted accordingly to deliver the necessary power to the PD 406. In various embodiments of the invention, the network elements may be modeled more complexly and may comprise reactances, current sources, etc.

Figure 5:
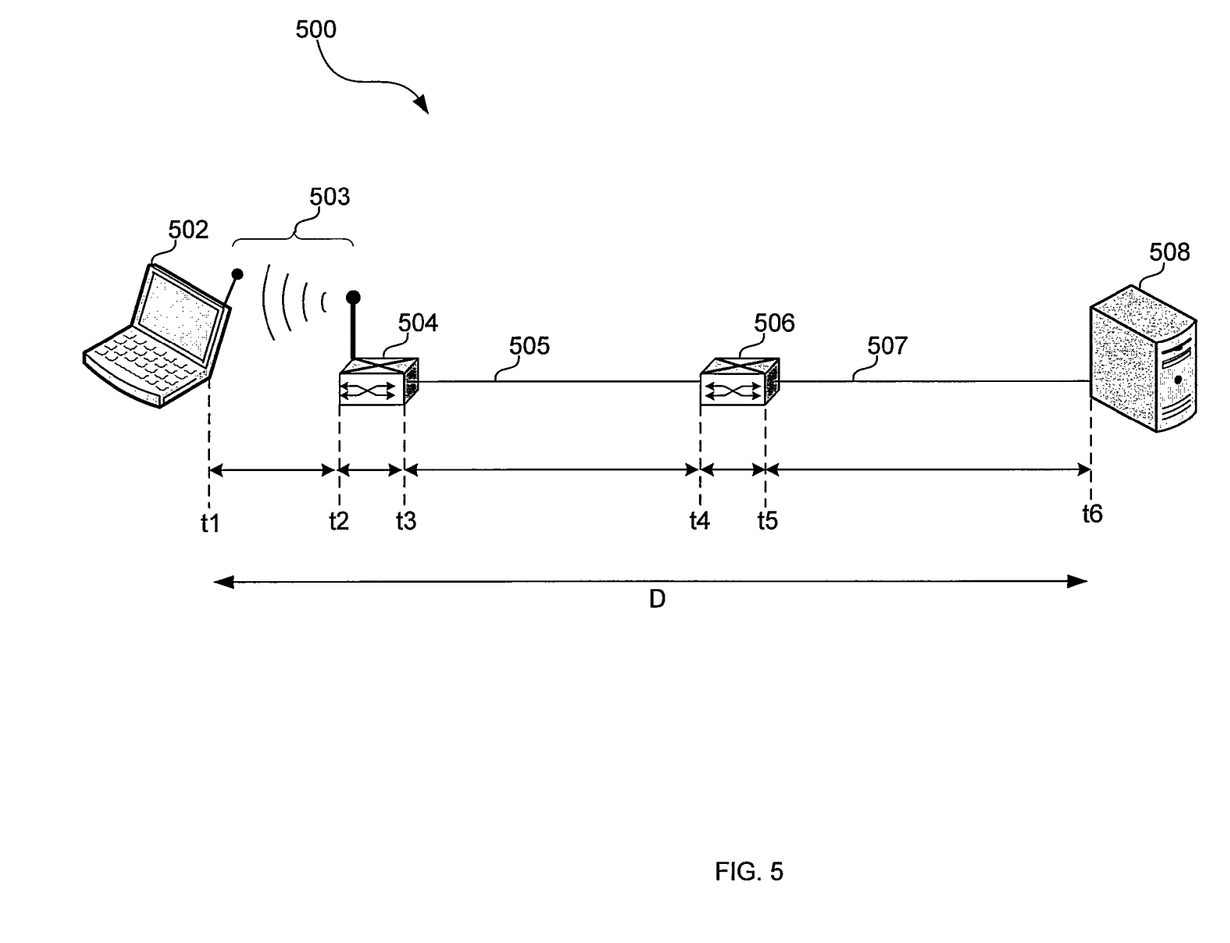
FIG. 5 is a diagram of an exemplary network for which proximity information may be determined, in accordance with an embodiment of the invention.

FIG. 5 is a diagram of an exemplary network for which proximity information may be determined, in accordance with an embodiment of the invention. Referring to the FIG. 5, the network 500 may comprise an end system 502, a wireless link 503, a wireless access point 504, a physical link 505, a bridge 506, a physical link 507, and an end system 508.

The network 500 may be similar to the network 100. In this regard, the end system 508 may determine the distance from itself to the end system 502. Accordingly, the nodes of the network may synchronize to the node 510 and timing information may be utilized to determine the distance between end systems 502 and 510. In this manner, the distance may be determined according to the following relationship:

$$D=(t2-t1) \cdot S_{503}+(t4-t3)*S_{505}+(t6-t5)*S_{507} \qquad \text{EQ. 2}$$

where $S_{503}$, $S_{505}$, and $S_{507}$ are the speed of propagation along link 503, link 505, and link 507 respectively.

Aspects of the invention may be found in a method and system for computing a distance between network nodes based on timestamps corresponding to arrival of ingress packets at the network nodes and departure of egress packets from the network nodes. In this regard, the timestamps may be generated at the physical layer of the network nodes, such as in the PHY 304 comprising the network node 204 disclosed in FIG. 3. The propagation time from a first node, such as the node 102b of FIG. 1, to a second node, such as the node 102a of FIG. 1, may be calculated by subtracting latencies internal to intermediary nodes from the total time required to travel from the first node to the second node. Additionally, the propagation time may be multiplied by the speed of propagation on the links comprising the path from the first node to the second node. In this manner, the distance from the first node to the second node may be determined, for example, as depicted by EQ. 1 and EQ. 2.

Aspects of the invention may also enable authenticating and/or encrypting the generated timestamps and/or determined distances using, for example, MACsec protocols. In one embodiment of the invention, computed distances may be utilized to implement digital rights management. For example, the use of media may be restricted based on a computed distance from a node hosting the media, such as the node 508, to a node rendering the media, such as the node 502. In another embodiment of the invention, a computed distance may be utilized, for example, to determine a source and/or location of a network node originating a VoIP call. Additionally, a computed distance may be utilized to control and optimize power distributed over a network. In this regard, the computed distance may, for example, be utilized to account for resistive losses in a network cable, as disclosed in FIG. 5.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for computer networking performed by one or more processors, the method comprising:
   generating a first timestamp when a voltage detected on a path between a first network node and a second network node exceeds a predetermined reference voltage; and
   computing a distance between the first network node and the second network node based on the first timestamp and a second timestamp generated by the second network node contained within one or more packets that traverse the path, and based on a first propagation speed of a first portion of the path and a second propagation speed of a second portion of the path, the first propagation speed being different from the second propagation speed, including:
   computing an intermediary node latency internal to an intermediary node located in the path;
   computing a propagation time between the first network node and the second network node by subtracting the computed intermediary node latency from a total path travel time calculated based on the first timestamp and the second timestamp; and
   multiplying a first portion of the propagation time by the first propagation speed and multiplying a second portion of the propagation time by the second propagation speed to compute the distance.

2. The method according to claim 1, further comprising authenticating at least one of the generated first and second timestamps and the computed distance.

3. The method according to claim 1, further comprising encrypting at least one of the first and second timestamps and the computed distance.

4. The method according to claim 1, further comprising implementing digital rights management based on the computed distance.

5. The method according to claim 4, further comprising limiting via the digital rights management, use of media to a specified location based on the computed distance.

6. The method according to claim 1, further comprising determining a source of a call originating from the second network node based on the computed distance.

7. The method according to claim 1, further comprising controlling distribution of power over one or more corresponding links between the first network node and the second network node based on the computed distance.

8. The method according to claim 7, further comprising compensating for resistive losses due to the one or more corresponding links between the first network node and the second network node.

9. A system for computer networking, the system comprising:
   at least one processor for use in a first network node, the at least one processer being configured to:
   generate a first timestamp when a voltage detected on a path between the first network node and a second network node exceeds a predetermined reference voltage; and
   compute a distance between the first network node and the second network node based on the first timestamp generated by the first network node and a second timestamp generated by the second network node contained within one or more packets that traverse the path between the first network node and the second network node, and based on a first propagation speed of a first portion of the path and a second propagation speed of a second portion of the path, the first propagation speed being different from the second propagation speed, wherein the at least one processor is further configured to:
   compute an intermediary node latency internal to an intermediary node located in the path;
   compute a propagation time between the first network node and the second network node by subtracting the computed intermediary node latency from a total path travel time calculated based on the first timestamp and the second timestamp; and
   multiply a first portion of the propagation time by the first propagation speed and multiplying a second portion of the propagation time by the second propagation speed.

10. The system according to claim 9, wherein the at least one processor is further configured to authenticate at least one of the generated first and second timestamps and the computed distance.

11. The system according to claim 9, wherein the at least one processor is further configured to encrypt at least one of the first and second timestamps and the computed distance.

12. The system according to claim 9, wherein the at least one processor enables digital rights management based on the computed distance.

13. The system according to claim 12, wherein the at least one processor enables limiting, via the digital rights management, use of media to a specified location based on the computed distance.

14. The system according to claim 9, wherein the at least one processor is further configured to determine a source of a call originating from the second network nodes based on the computed distance.

15. The system according to claim 9, wherein the at least one processor is further configured to control distribution of power over one or more corresponding links between the first network node and the second network node based on the computed distance.

16. The system according to claim 15, wherein the at least one processor is further configured to compensate for resistive losses due to the one or more corresponding links between the first network node and the second network node.

17. The method of claim 1, further comprising forwarding a sync packet, generated based on a master clock of the first network node, to the second network node for synchronizing a clock of the second network node with the master clock.

18. The method of claim 1, wherein the intermediary node latency is computed based on at least one timestamp generated by the intermediary node.

19. The method of claim 7, further comprising:
    calculating a total resistance of the path by multiplying the distance by a resistance per unit length of the path; and
    outputting a voltage onto the path that is sufficient to deliver at least a minimum signal power to the second network node based on the total resistance of the path.

\* \* \* \* \*